United States Patent
Franklin et al.

(10) Patent No.: US 10,216,233 B2
(45) Date of Patent: Feb. 26, 2019

(54) FORMING FEATURES IN A CERAMIC COMPONENT FOR AN ELECTRONIC DEVICE

(71) Applicant: Apple Inc., Cupertino, CA (US)

(72) Inventors: Jeremy C. Franklin, Cupertino, CA (US); Kristina A. Babiarz, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 512 days.

(21) Appl. No.: 14/843,004

(22) Filed: Sep. 2, 2015

(65) Prior Publication Data

US 2017/0060193 A1  Mar. 2, 2017

(51) Int. Cl.

| | |
|---|---|
| *B24B 29/04* | (2006.01) |
| *B24B 19/03* | (2006.01) |
| *G06F 1/16* | (2006.01) |
| *A45C 11/00* | (2006.01) |
| *B24B 29/00* | (2006.01) |
| *A45C 3/00* | (2006.01) |

(52) U.S. Cl.
CPC ............ *G06F 1/1684* (2013.01); *A45C 3/001* (2013.01); *A45C 11/00* (2013.01); *B24B 19/03* (2013.01); *B24B 29/005* (2013.01); *B24B 29/04* (2013.01); *A45C 2011/002* (2013.01); *A45C 2011/003* (2013.01)

(58) Field of Classification Search
CPC ....... B24B 19/03; B24B 29/005; B24B 29/04; B24B 29/06
USPC ................................... 451/41, 242, 246, 257
See application file for complete search history.

(56) References Cited

U.S. PATENT DOCUMENTS

| | | | |
|---|---|---|---|
| 1,675,910 A | 7/1928 | Riker | |
| 2,210,094 A * | 8/1940 | Mueller | A46B 9/026 |
| | | | 15/179 |

(Continued)

FOREIGN PATENT DOCUMENTS

| | | |
|---|---|---|
| CN | 201022205 | 2/2008 |
| CN | 201248054 | 5/2009 |

(Continued)

OTHER PUBLICATIONS

Author Unknown, "Laboratory Instruments," http://www.mocon.com, 2 pages, at least as early as Oct. 12, 2012.

(Continued)

*Primary Examiner* — Eileen Morgan
(74) *Attorney, Agent, or Firm* — Dorsey & Whitney LLP

(57) ABSTRACT

A three-dimensional feature is formed in a surface of a component. Material is removed from the component by rotating an abrading tool about a first axis. While the abrading tool is rotated, the component (and/or a shaft coupled to the abrading tool) is rotated on a second axis. The second axis may be transverse to the first axis and may run through a center of the three-dimensional feature. The abrading tool may correspond to the three-dimensional feature. For example, the abrading tool may be configured to contact an entirety of an exterior of the three-dimensional feature during the removal operation, fill the three-dimensional feature during the removal operation, and/or have a shape that corresponds to the shape of the three-dimensional feature in two planes that are normal to each other.

9 Claims, 8 Drawing Sheets

(56) References Cited

U.S. PATENT DOCUMENTS

| | | | |
|---|---|---|---|
| 2,420,989 A * | 5/1947 | Waldron | B24B 7/24 451/271 |
| 2,728,929 A * | 1/1956 | Bell | A46B 3/18 15/104.011 |
| 2,859,510 A | 11/1958 | Baxa | |
| 2,909,281 A | 10/1959 | Koskinen | |
| 3,012,384 A * | 12/1961 | Brown | B24B 7/24 451/41 |
| 3,123,910 A | 3/1964 | Neilson | |
| 3,202,561 A | 8/1965 | Swanson et al. | |
| 3,290,832 A * | 12/1966 | Highberg | B24B 7/242 451/1 |
| 3,346,904 A * | 10/1967 | Armstrong | A44B 18/00 128/DIG. 15 |
| 3,696,563 A * | 10/1972 | Rands | B24D 13/10 15/197 |
| 4,038,783 A | 8/1977 | Rosenthal | |
| 4,111,029 A | 9/1978 | Dulaquais | |
| 4,164,704 A | 8/1979 | Kato et al. | |
| 4,232,928 A | 11/1980 | Wickersham | |
| 4,445,300 A * | 5/1984 | Sekiya | B24D 7/06 451/41 |
| 4,552,800 A | 11/1985 | Blasch et al. | |
| 4,584,799 A | 4/1986 | Juvet | |
| 4,594,814 A * | 6/1986 | Olszewski | B24B 9/10 451/132 |
| 4,753,918 A | 6/1988 | Cyron | |
| 4,911,796 A | 3/1990 | Reed | |
| 4,945,687 A * | 8/1990 | Scheider | B24D 3/32 451/532 |
| 5,021,213 A | 6/1991 | Nishio et al. | |
| 5,028,075 A | 7/1991 | Donnelly | |
| 5,083,401 A * | 1/1992 | Yamashita | B24B 7/228 451/11 |
| 5,144,536 A | 9/1992 | Tsukada et al. | |
| 5,217,335 A | 6/1993 | Houchens, Jr. et al. | |
| 5,276,999 A * | 1/1994 | Bando | B23Q 7/035 451/303 |
| 5,280,819 A | 1/1994 | Newkirk et al. | |
| 5,329,735 A * | 7/1994 | Charlton | B24B 9/10 451/41 |
| 5,353,463 A * | 10/1994 | Bracy, Jr. | A46B 9/02 15/143.1 |
| 5,590,387 A | 12/1996 | Schmidt et al. | |
| 5,720,649 A * | 2/1998 | Gerber | B24B 13/06 451/41 |
| 5,779,218 A | 7/1998 | Kowanz | |
| 5,843,117 A | 12/1998 | Alt et al. | |
| 5,953,989 A | 9/1999 | Uchiyama et al. | |
| 6,087,191 A | 7/2000 | Boggs | |
| 6,110,015 A * | 8/2000 | Christianson | B24B 13/01 451/41 |
| 6,149,506 A | 11/2000 | Duescher | |
| 6,183,347 B1 | 2/2001 | Shaw | |
| 6,276,994 B1 * | 8/2001 | Yoshida | B23Q 3/157 451/41 |
| 6,406,769 B1 | 6/2002 | Delabre | |
| 6,413,895 B1 | 7/2002 | Merkel et al. | |
| 6,453,783 B2 | 9/2002 | Yu et al. | |
| 6,464,080 B1 | 10/2002 | Morris et al. | |
| 6,517,995 B1 | 2/2003 | Jacobson et al. | |
| 6,811,136 B2 | 11/2004 | Eberhardt et al. | |
| 7,122,057 B2 | 10/2006 | Beam et al. | |
| 7,171,838 B2 | 2/2007 | Shiokawa | |
| 7,540,697 B2 | 6/2009 | Wang et al. | |
| 7,582,175 B2 | 9/2009 | Trejo-Rincon | |
| 7,597,483 B2 | 10/2009 | Simmons et al. | |
| 7,685,676 B2 | 3/2010 | McClellan | |
| 7,724,532 B2 | 5/2010 | Zadesky et al. | |
| 7,774,918 B2 | 8/2010 | Ainsworth | |
| 8,015,852 B2 | 9/2011 | Su | |
| 8,052,743 B2 | 11/2011 | Weber et al. | |
| 8,066,251 B2 | 11/2011 | Brown | |
| 8,157,936 B2 | 4/2012 | Tsuzuki et al. | |
| 8,252,379 B2 | 8/2012 | Nagashima | |
| 8,295,902 B2 | 10/2012 | Salahieh et al. | |
| 8,439,947 B2 | 5/2013 | Howard et al. | |
| 8,454,705 B2 | 6/2013 | Pressacco et al. | |
| 8,460,060 B2 * | 6/2013 | Wilson | B24B 13/00 451/28 |
| 8,530,847 B2 | 9/2013 | Frank et al. | |
| 8,564,961 B2 | 10/2013 | Weber | |
| 8,568,551 B2 | 10/2013 | Brennan et al. | |
| 8,597,078 B2 * | 12/2013 | Wilson | B24B 13/00 451/28 |
| 8,601,849 B2 | 12/2013 | Luo et al. | |
| 8,703,040 B2 | 4/2014 | Liufi et al. | |
| 8,733,422 B2 | 5/2014 | Browning et al. | |
| 8,738,104 B2 | 5/2014 | Yeates | |
| 8,994,608 B2 | 3/2015 | Russell-Clarke et al. | |
| 9,132,510 B2 | 9/2015 | Russell-Clarke et al. | |
| 9,221,289 B2 | 12/2015 | Prest et al. | |
| 9,284,228 B2 | 3/2016 | Nahas et al. | |
| 9,634,378 B2 | 4/2017 | Golko et al. | |
| 9,750,322 B2 | 9/2017 | Nazzaro et al. | |
| 2005/0064345 A1 | 3/2005 | Oyake | |
| 2006/0008616 A1 | 1/2006 | Dean et al. | |
| 2006/0097127 A1 | 5/2006 | Firth | |
| 2006/0162849 A1 | 7/2006 | Han | |
| 2007/0019395 A1 | 1/2007 | Yeh et al. | |
| 2007/0039691 A1 | 2/2007 | Mroz | |
| 2008/0206509 A1 | 8/2008 | Kent et al. | |
| 2008/0257006 A1 | 10/2008 | Durney et al. | |
| 2008/0312727 A1 | 12/2008 | Blank | |
| 2009/0014118 A1 | 1/2009 | Ratcliffe | |
| 2009/0043228 A1 | 2/2009 | Northrop et al. | |
| 2010/0197203 A1 * | 8/2010 | Wilson | B24B 1/00 451/41 |
| 2010/0285248 A1 | 11/2010 | Zhu et al. | |
| 2011/0041553 A1 | 2/2011 | Xiong et al. | |
| 2011/0156361 A1 | 6/2011 | Ghalambor et al. | |
| 2011/0267773 A1 | 11/2011 | MacFarlane | |
| 2012/0212890 A1 | 8/2012 | Hoshino et al. | |
| 2013/0216740 A1 | 8/2013 | Russell-Clarke et al. | |
| 2013/0251934 A1 | 9/2013 | Caracciolo et al. | |
| 2013/0318766 A1 | 12/2013 | Kiple et al. | |
| 2014/0076731 A1 | 3/2014 | Russell-Clarke et al. | |
| 2014/0082926 A1 | 3/2014 | Tam et al. | |
| 2014/0102162 A1 | 4/2014 | Morgenstern et al. | |
| 2014/0106129 A1 | 4/2014 | Teshima et al. | |
| 2014/0364043 A1 * | 12/2014 | Lancaster-Larocque | B24B 9/00 451/54 |
| 2015/0273524 A1 | 10/2015 | Ely et al. | |
| 2015/0289395 A1 | 10/2015 | Van Asseldonk et al. | |
| 2015/0374397 A1 * | 12/2015 | Brannon | A61B 17/32002 606/84 |
| 2016/0089811 A1 | 3/2016 | Matsuyuki et al. | |
| 2016/0090326 A1 | 3/2016 | Matsuyuki et al. | |
| 2016/0256979 A1 | 9/2016 | Matsuyuki et al. | |
| 2017/0060193 A1 | 3/2017 | Franklin et al. | |
| 2017/0304032 A1 | 10/2017 | Jung et al. | |

FOREIGN PATENT DOCUMENTS

| | | |
|---|---|---|
| CN | 101693629 | 4/2010 |
| CN | 101877951 | 11/2010 |
| CN | 201940834 | 8/2011 |
| CN | 102316179 | 1/2012 |
| CN | 102695966 | 9/2012 |
| CN | 202720538 | 2/2013 |
| CN | 202872871 | 4/2013 |
| CN | 203191877 | 9/2013 |
| CN | 203492064 | 3/2014 |
| CN | 103864452 | 6/2014 |
| CN | 103873619 | 6/2014 |
| CN | 103951420 | 7/2014 |
| JP | 60244493 | 12/1985 |
| JP | 200061745 | 2/2000 |
| KR | 1020080103031 | 11/2008 |

(56) References Cited

FOREIGN PATENT DOCUMENTS

| WO | WO03/002289 | 1/2003 |
| WO | WO2012/007755 | 1/2012 |
| WO | WO2013/093822 | 6/2013 |

OTHER PUBLICATIONS

Author Unknown, "Stewmac Inlay Tools and Materials," http://web.archirve.org/...op/Inlay,_pearl/Tools_and_supplies_for:_Inlay,_pearl_cutting/Carbide_Downcut_Inlay_Router_Bits.html, 5 pages, at least as early as Dec. 4, 2013.

* cited by examiner

FORMING FEATURES IN A CERAMIC COMPONENT FOR AN ELECTRONIC DEVICE

FIELD

The described embodiments relate generally to forming features in components for an electronic device. More particularly, the present embodiments relate to forming recessed features in a ceramic component for an electronic device.

BACKGROUND

Materials such as metal or glass, sapphire, or other ceramics may be finished using a variety of different abrading or other material removal processes. For example, polishing may rub a surface of a part using a tool (such as a bristle brush) to achieve a particular surface finish. In many cases, polishing is performed on flat or planar surfaces using flat rotary brushes. Such a process may work well for polishing flat surfaces, but may not create as uniform a polished finish for three-dimensional features.

SUMMARY

The present disclosure relates to finishing three-dimensional features using abrading and/or other processes that remove material. A three-dimensional feature may be formed in a surface of a component. Material may be removed from the component by rotating an abrading tool about a first axis. While the abrading tool is rotated, the component may be rotated on a second axis. The second axis may be transverse to the first axis and may run through a center of the three-dimensional feature. The abrading tool may correspond to the three-dimensional feature. For example, the abrading tool may be configured to contact an entirety of an exterior of the three-dimensional feature during the removal operation, fill the three-dimensional feature during the removal operation, and/or have a shape that corresponds to the shape of the three-dimensional feature in two planes that are normal to each other. In this way, material may be removed from portions of the three-dimensional feature in a first direction and subsequently material may be removed from the same portions in one or more additional directions. This may prevent, reduce, and/or ameliorate streaks, brush lines or other artifacts related to the material removal.

In various embodiments, a method for forming a three-dimensional feature in a surface of a cover for an electronic device may include removing material from the cover by rotating an abrading tool about a first axis and, while rotating the abrading tool about the first axis, rotating the cover (through an angle such as at least 90 degrees) about a second axis (which may run through a center of the three-dimensional feature) that is transverse to the first axis. The abrading tool may contact an entirety of an exterior of the three-dimensional feature during the operation of removing the material.

In some examples, the operation of removing the material may include polishing the three-dimensional feature. The method may also include polishing the surface of the cover. The surface may be planar. The operation of polishing the surface of the cover may include polishing the surface of the cover using a flat rotary brush.

In some examples, the operation of removing the material may form the three-dimensional feature in a flat area of the surface. In various examples, the three-dimensional feature may have a concave dome shape and the abrading tool may have a convex shape matching the concave dome shape. In some examples, the three-dimensional feature may be a dish.

In various examples, the operation of removing the material may abrade a portion of the exterior of the three-dimensional feature in a first direction and then abrade the portion of the exterior of the three-dimensional feature in a second direction.

In some embodiments, an abrading apparatus may include a controller, an abrading tool, a first movement mechanism operatively coupled to the controller and configured to rotate the abrading tool about a first axis, and a second movement mechanism operatively coupled to the controller and configured to cause relative rotation between the abrading tool and a ceramic component about a second axis transverse to the first axis. The controller may be configured to synchronize rotation of the first and second movement mechanisms to form a three-dimensional feature in a planar surface of the ceramic component, such as a curved depression in the planar surface. The abrading tool (which may be a spherical brush) may fill the three-dimensional feature.

In some examples, the second movement mechanism may be configured to cause relative rotation between the abrading tool and the ceramic component on the second axis by rotating the ceramic component about the second axis. In other examples, the second movement mechanism may be configured to cause relative rotation between the abrading tool and the ceramic component on the second axis by rotating a shaft coupled to the abrading tool about the second axis.

In various examples, the abrading tool may be a brush with multiple bristles having at least one of multiple bristle dimensions, multiple bristle materials, or multiple bristle hardnesses.

In various embodiments, a component (such as ceramic or metal) may include a flat surface and a concave depression formed in the flat surface. The concave depression may have a polished finish formed by rotating a polishing tool on a first axis while rotating the flat surface on a second axis transverse to the first axis. The polishing tool may have a shape that corresponds to a shape of the concave depression in two planes that are normal to each other.

In some examples, the component may form a cover for an electronic device. In various examples, the concave depression may form a user input region for an electronic device.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

The following disclosure relates to finishing three-dimensional features using abrading and/or other processes that remove material, such as polishing, lapping, and grinding. A three-dimensional feature may be formed in a surface of a component. Material may be removed from the component by rotating an abrading tool about a first axis. While the abrading tool is rotated, the component (and/or a shaft coupled to the abrading tool) may be rotated on a second axis. The second axis may be transverse to the first axis and may run through a center of the three-dimensional feature. The abrading tool may correspond to the three-dimensional feature. For example, the abrading tool may be configured to contact an entirety of an exterior of the three-dimensional feature during the removal operation, fill the three-dimensional feature during the removal operation, and/or have a shape that corresponds to the shape of the three-dimensional feature in two planes that are normal to each other. In this way, material may be removed from portions of the three-dimensional feature in a first direction and subsequently material may be removed from the same portions in one or more additional directions. This may prevent, reduce, and/or ameliorate streaks, brush lines or other artifacts related to the material removal.

The material removal may be a polishing process. In such embodiments, this process may result in a more uniform polished finish than processes that polish in a single direction. Using the process to produce a uniform polished finish may remove defects such as micro cracks formed by previously performed processes that were used to form and/or process the three-dimensional feature, increasing the strength of the three-dimensional feature. Further, this process may prevent formation of streaks, grooves, and/or other defects as the three-dimensional feature is being formed.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
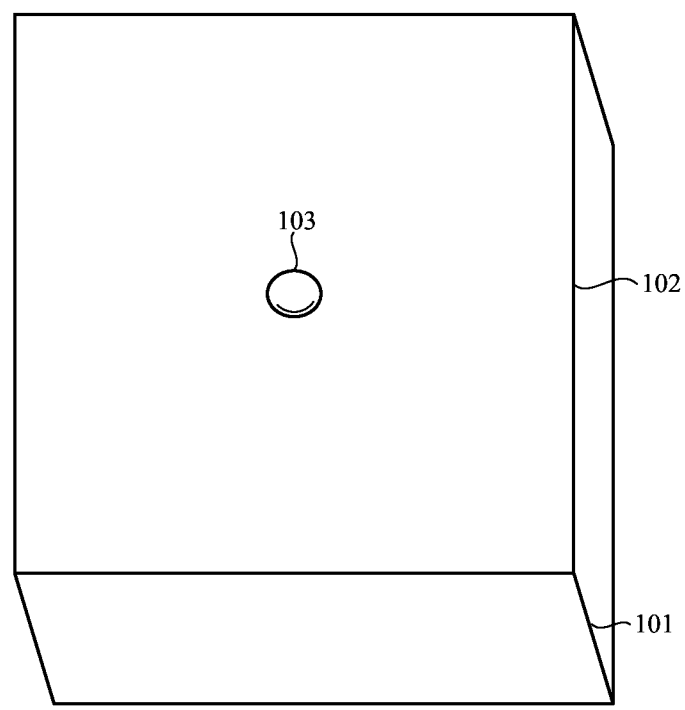
FIG. 1 shows a device having a three-dimensional feature formed in the flat or planar surface of a cover.

FIG. 1 shows a device 101 having a three-dimensional feature 103 formed in the cover 102. As shown, the three-dimensional feature 103 may be a concave depression (e.g., "dish," curved, or otherwise shaped). The three-dimensional feature 103 may have a polished finish. The cover 102 may also have an additional polished finish, which may be formed using a different process than the polished finish of the three-dimensional feature 103. For example, the polished finish on the cover 102 may be produced using flat rotary brushes whereas the polished finish on the three-dimensional feature 103 is produced using one of the example abrading and/or other material removal processes described with respect to FIGS. 2A-4 and/or 9 below.

In various implementations, the three-dimensional feature 103 may form an input feature configured as part of an assembly that is operable to receive input. For example, in some implementations, a switch, touch sensor, force sensor, and/or other sensor may be positioned under the cover 102 opposing the three-dimensional feature 103. As such, touch and/or exertion of force on the three-dimensional feature 103 may be detected and/or utilized as input. In some cases, the sensor may be configured to obtain one or more biometrics relating to a user's body part, such as the user's finger. Such biometrics may include one or more fingerprints, health data, and so on. In such an implementation, the three-dimensional feature 103 may be a thinned area of the cover 102 that facilitates the sensor in obtaining the biometric. For example, a biometric obtained through the thinner area of the three-dimensional feature 103 may be more accurate than a biometric obtained through other thicker portions of the cover 102.

By way of another example, in some implementations, the three-dimensional feature 103 may be formed on an interior surface as opposed to an external surface. In such an example, the three-dimensional feature 103 may be a depression for receiving a component such as a camera, lens, button, or other protrusion.

Although the device 101 is illustrated as a tablet computing device, it is understood that this is an example. Three-dimensional features in a variety of different materials, components, and/or devices may be abraded and/or polished utilizing the techniques discussed herein without departing from the scope of the present disclosure.

Figure 2A:
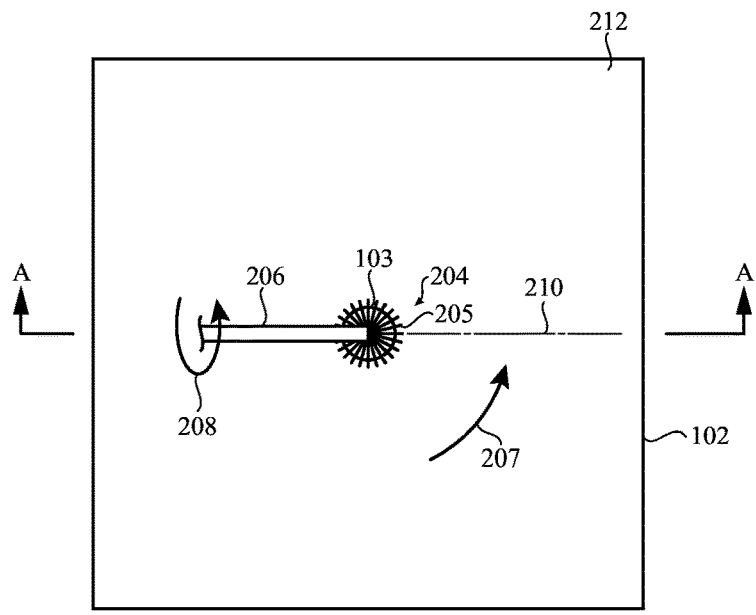
FIGS. 2A-2B show performance of an example abrading process on the three-dimensional feature formed in a flat or planar surface of the cover.
Figure 2B:
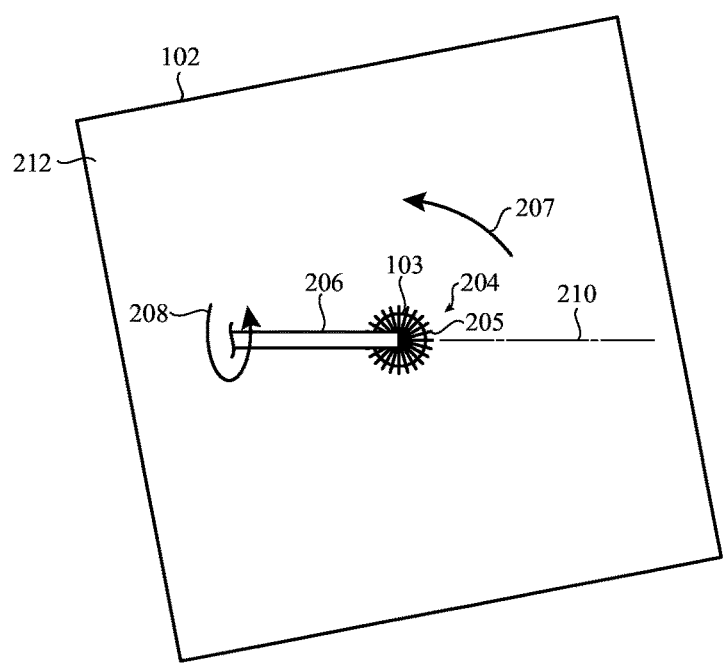

FIGS. 2A-2B show performance of an example abrading and/or other material removal process on the three-dimensional feature 103 formed in a flat or planar surface 212 that forms the cover 102. The three-dimensional feature 103 may be abraded by an abrading tool 204 on a shaft 206 that is rotated on an axis 210 in a first direction 208 while the cover 102 is rotated on a transverse axis (see FIG. 3) in a second direction 207. As shown, the abrading tool 204 may be a spherical brush with bristles 205. FIG. 2B shows the planar surface 212 rotated approximately 120 degrees during the abrading from the position shown in FIG. 2A. While FIGS. 2A-2B depict a rotation of approximately 120 degrees, the amount of rotation may vary.

Although the above describes continuous and/or intermittent rotation of the planar surface 212 in the second direction 207, it is understood that this is an example and that other movement patterns may be used without departing from the scope of the present disclosure. For example, in some implementations, the cover 102 may be rotated in increments of at least 90 degrees in the second direction 207 with pauses in between rotation increments. By way of another example, in various implementations, the cover 102 may be rotated 180 degrees in the second direction 207 before being rotated 180 degrees in a direction opposite to the second direction 207.

Figure 3:
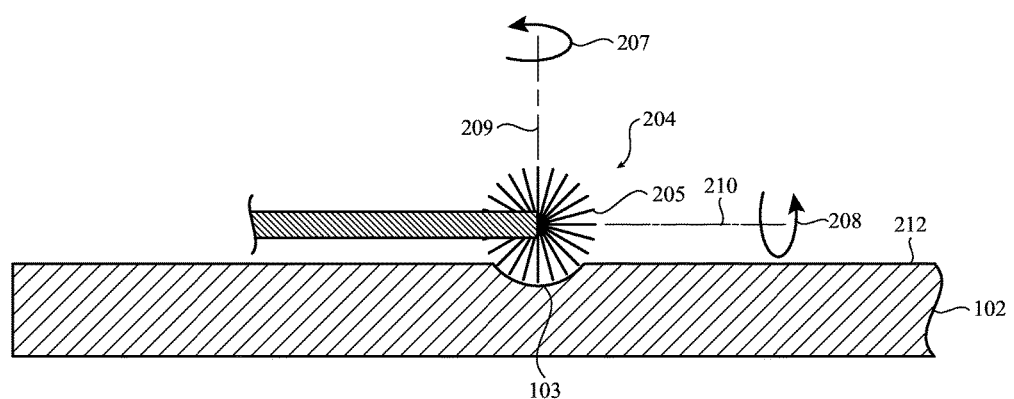
FIG. 3 shows a partial cross-sectional view of the example abrading process illustrated in FIG. 2A, taken along line A-A of 2A.

FIG. 3 shows a partial cross-sectional view of the example abrading process illustrated in FIG. 2A, taken along line A-A of 2A. The abrading tool 204 is rotated on the first axis 210 in the first direction 208 while the cover 102 is rotated on the second axis 209 in the second direction 207. The second axis 209 is transverse (e.g., orthogonal) to the first axis 210 and runs through a center of the three-dimensional feature 103. The transverse relationship of the rotations allows the abrading to be performed in multiple directions. In this example, the abrading tool 204 contacts the entirety of the exterior (e.g., the outer surface) of the three-dimensional feature 103 and abrades the portions of exterior of the three-dimensional feature 103 in a first direction and then in subsequent directions, different from the first direction, as the cover 102 rotates, changing the position of the abrading tool 204 relative to those same portions. As the abrading is performed in multiple directions, a more uniform polished finish may be formed and may remove defects such as micro cracks in the three-dimensional feature 103 caused by previous processes performed on the three-dimensional feature 103 and/or the formation of the three-dimensional feature 103.

Further, the abrading tool 204 has a shape that corresponds to the shape of the three-dimensional feature 103 in two planes that are normal to each other, filling the three-dimensional feature with a portion of the abrading tool 204. This allows repeated abrading of portions of the three-dimensional feature 103 in different directions as the cover 102 rotates as the entirety of the exterior of the three-dimensional feature is contacted during material removal. This prevents streaking, brush lines, and/or other polishing artifacts that can result from single direction polishing and/or other polishing processes.

The shapes of the abrading tool 204 and the three-dimensional feature 103 may correspond in a variety of ways. For example, the three-dimensional feature 103 is shown as a curved depression that has a concave dome shape (concave with respect to the planar surface 212 of the cover 102) whereas the abrading tool 204 has a corresponding convex dome shape. The concavity of the three-dimensional feature 103 is shown as corresponding to the convexity of the abrading tool 204 such that the abrading tool 204 is able to substantially fill the three-dimensional feature 103 during abrading. For example, as shown, the radius of the abrading tool 204 corresponds, or substantially corresponds, to a diameter of the three-dimensional feature 103. This further allows the entirety of the exterior of the three-dimensional feature 103 to be contacted simultaneously, repeatedly abrading portions of the three-dimensional feature 103 in different directions as the cover 102 rotates.

However, in other implementations, the portion of the abrading tool 204 that contacts the three-dimensional feature 103 and the three-dimensional feature 103 may be sized differently. For example, the three-dimensional feature 103 may be a depression with a diameter twice as wide as the radius of the abrading tool 204. In such an example, the abrading tool 204 may be positioned to abrade a portion of the three-dimensional feature 103 and then translated to abrade another portion until the entire exterior of the three-dimensional feature 103 is abraded.

As shown, the bristles 205 of the abrading tool 204 are illustrated as having the same length and thickness. However, it is understood that this is an example. In various implementations, the abrading tool 204 may have bristles 205 with multiple dimensions (i.e., different lengths, thicknesses, and so on), multiple materials (such as pig hair, nylon or other synthetic materials, plant fibers, and/or other materials), multiple hardnesses (such as a Shore that may vary between approximately 20 and 85, and so on), and/or other varying bristle 205 properties.

A slurry may be positioned between the abrading tool 204 and the three-dimensional feature 103 during abrading. Such a slurry may include abrasive particles of various sizes such as emery, silicon carbide, diamond, and so on. The slurry may be recirculated during abrading and may aid in material removal. Movement of the slurry may be facilitated and/or caused by the motion of the abrading tool 204.

In some implementations, the cover 102 may be glass or other ceramics such as sapphire. However, it is understood that this is an example. This abrading process may be performed on a variety of other materials such as metals, plastics, and so on without departing from the scope of the present disclosure.

Although the above describes abrading all of a three-dimensional feature 103 simultaneously, it is understood that this is an example. In various implementations, other processes are possible and contemplated without departing from the scope of the present disclosure. For example, in some implementations, the abrading tool 204 may be oscillated to transition from abrading curved and/or other three-dimensional surfaces to abrading flat and/or otherwise planar surfaces.

In some implementations, the abrading tool 204 may form the three-dimensional feature 103 by abrading a flat area of the planar surface 112. In other implementations, the abrading tool 204 may abrade a three-dimensional feature formed in the planar surface 112 to finish forming the three-dimensional feature 103.

Figure 4:
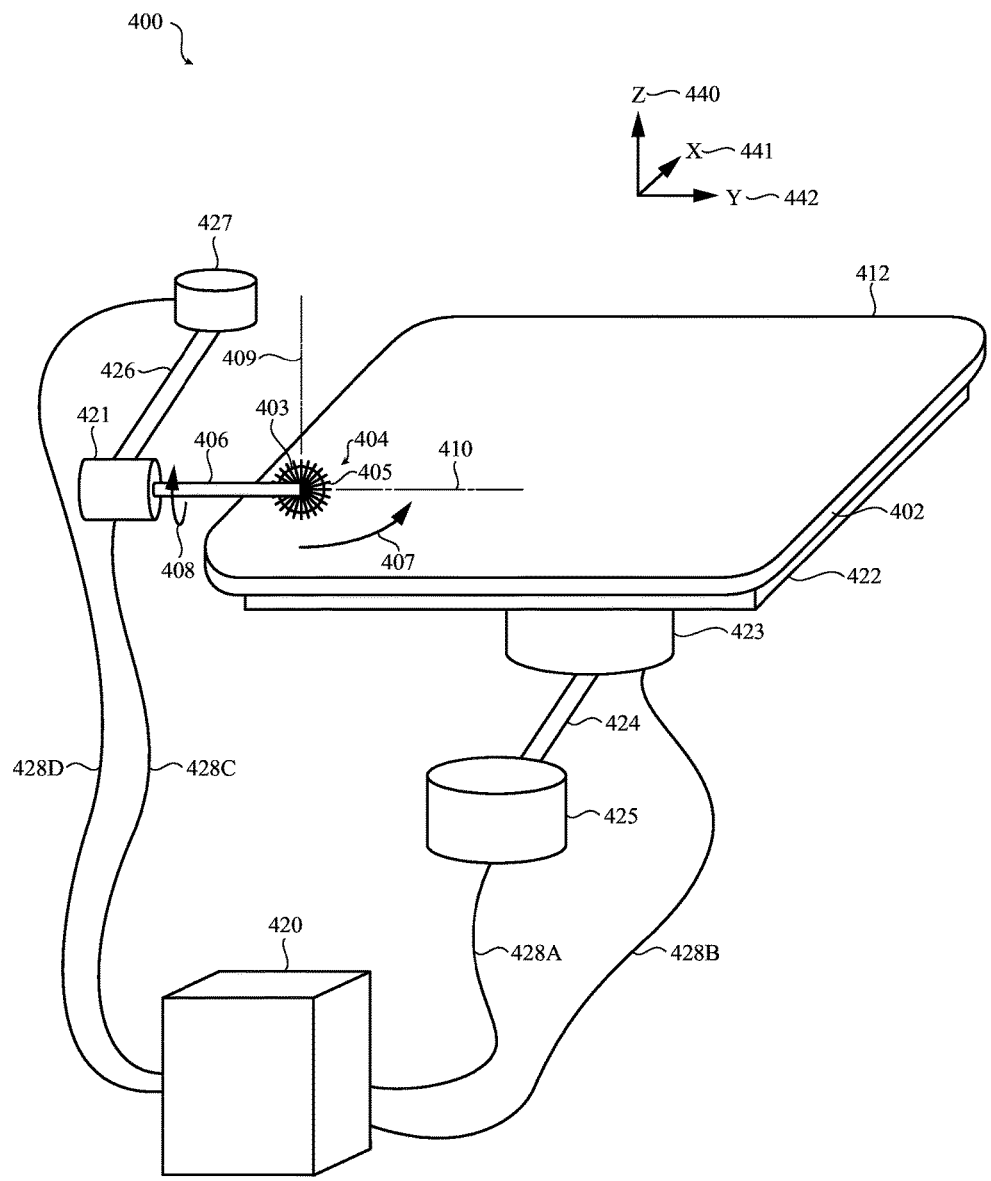
FIG. 4 shows an apparatus for performing an example abrading or other material removal operation on a three-dimensional feature formed in a planar surface.

FIG. 4 shows an apparatus 400 (such as an abrading apparatus 400) for performing an example abrading or other material removal operation on a three-dimensional feature 403 formed in a planar surface 412 of a ceramic component 402. The apparatus 400 may be programmed and/or controlled to perform abrading or other material removal processes that may be the same, similar, and/or different than those discussed above with respect to FIGS. 2A-3.

The apparatus 400 includes a support 422 that supports the ceramic component 402 and a controller 420 (which may include one or more processing units, non-transitory storage media such as memories, and/or other components) that is operable to control movement mechanisms (such as motors) 421, 423, 425, and 427 via control lines 428A-D in order to perform the abrading operation.

The first movement mechanism 421, under control of the controller 420, may be operable to rotate a spherical brush tool 404 having a shaft 406 (such as an abrading tool) on a first axis 410 in a direction 408 such that the bristles 405 of the spherical brush tool 404 abrade the three-dimensional feature 403. Similarly, the second movement mechanism 423 may be operable under the control of the controller 420 to rotate the support 422, and thus the ceramic component 402, on a second axis 409 transverse to the first axis 410 in a direction 407 (and/or otherwise cause relative rotation between the spherical brush tool 404 and the ceramic component 402). Thus, the controller 420 may be configured to synchronize rotation of the movement mechanisms 421 and 423 to form the three-dimensional feature 403.

The movement mechanisms 421 and 423 may be respectively connected to third and fourth movement mechanisms 425 and 427 via arms 424 and 426. The movement mechanisms 425 and/or 427 may thus be manipulated via the controller 420 to translate the spherical brush tool 404 and/or the ceramic component 402 with respect to each other. For example, the movement mechanisms 425 and/or 427 may be manipulated to translate the spherical brush tool 404 and the ceramic component 402 closer to each other and/or farther apart in a Z 440 direction, translate the spherical brush tool 404 along the planar surface 412 of the ceramic component 402 in X 441 and/or Y 442 directions (and/or translate the ceramic component 402 such that the spherical brush tool 404 is moved along the planar surface 412 of the ceramic component 402 in the X 441 and/or Y 442 directions), and so on.

Although movement mechanisms 425 and/or 427 are shown as motors in this example, it is understood that this is an example. In various implementations, other movement mechanisms may be utilized to translate the spherical brush tool 404 and/or the ceramic component 402 with respect to each other. In one example, the spherical brush tool 404 and/or the ceramic component 402 may be translated using a multi-axis gantry system or similar movement mechanism. In various examples, such movement mechanisms may move the spherical brush tool 404 and/or the ceramic component 402 without moving the movement mechanisms 421 and/or 423.

Further, although the apparatus 400 is illustrated and described as processing a single ceramic component 402 at a time, it is understood that this is an example. In various implementations, the apparatus 400 may include multiple spherical brush tools 404 and/or other components (and/or different support, and/or control mechanisms than those depicted) and may process multiple ceramic component 402 at a single time without departing from the scope of the present disclosure. For example, in some implementations, two ceramic component 402 may be positioned with three-dimensional features 403 on opposing surfaces that are abraded by separate spherical brush tools 404 at the same time.

Moreover, although a single controller 420 is illustrated and described, it is understood that this is an example. In various implementations, multiple controllers, distributed controllers, and/or other controller configurations may be utilized without departing from the scope of the present disclosure.

In other examples, the controller 420 may use the spherical brush tool 404 to abrade the three-dimensional feature 403 while the ceramic component 402 rotates as described above and then transition to use a flat rotary brush to polish the surface 412 while the ceramic component 402 does not rotate.

Furthermore, although the controller 420 is illustrated and described as causing relative rotation between the spherical brush tool 404 and the ceramic component 402 by rotating the ceramic component 402, it is understood that this is an example. In various implementations, the ceramic component 402 may not be rotated. In some cases of such implementations, the controller 420 may instead rotate the spherical brush tool 404 in the direction 407 while rotating the spherical brush tool 404 in the direction 408.

Figure 5A:
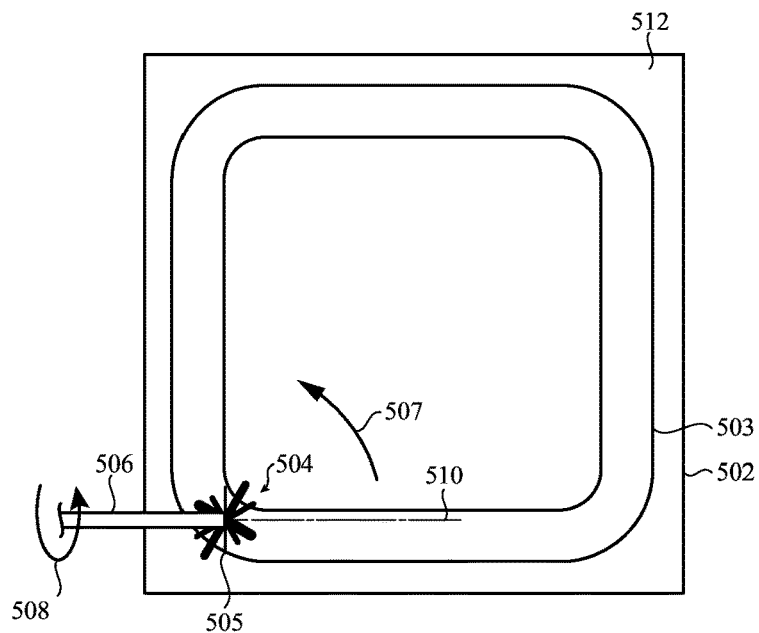
FIGS. 5A-5B show formation of another three-dimensional feature using an abrading process in accordance with further embodiments.
Figure 5B:
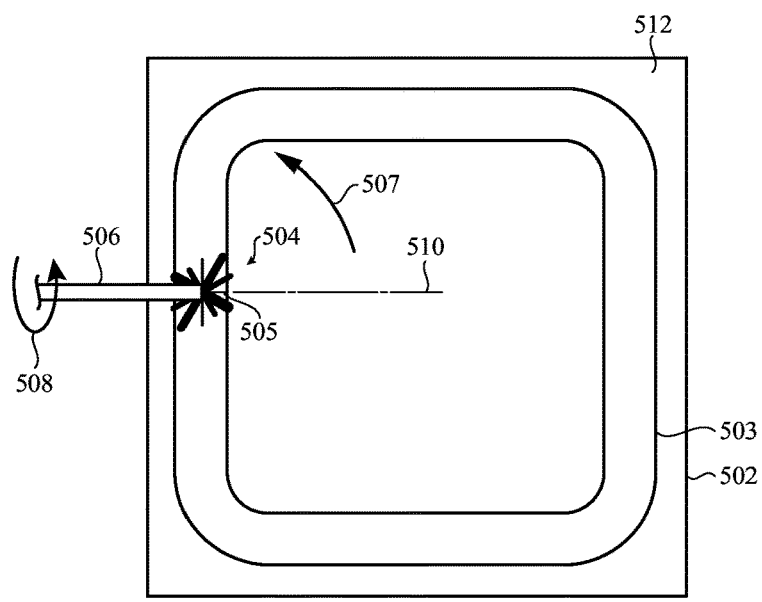

FIGS. 5A-5B show formation of another three-dimensional feature using an abrading process in accordance with further embodiments. As contrasted with the example shown in FIGS. 2A-2B and 3, the three-dimensional feature 103 is instead a groove 503 in the perimeter of the underside surface 512 of a cover 502.

The bristles 505 of a tool 504 coupled to a shaft 506 may fill a segment of the groove 503 as the tool 504 rotates on an axis 510 in the direction 508 while the cover 502 is rotated on a transverse axis (not labelled as the transverse axis is not visible in a top down view) in the direction 507, centered on the segment of the groove 503. Portions of the segment of the groove 503 may thus be abraded in multiple directions before the tool 504 and/or the cover 502 is translated to move the tool 504 to an adjacent segment of the groove 503. The whole groove 503 may be abraded in this way by repetition of the rotation of the tool 504 and the cover 502 and translation of the tool 504 and/or cover 502 to move the tool 504 around the perimeter of the groove 503.

As shown, the bristles 505 of the tool 504 are illustrated as having multiple different lengths and thicknesses. However, it is understood that this is an example. In various implementations, the tool 504 may have bristles 505 with all the same and/or various different dimensions, hardnesses, and/or other properties. Further, in various implementations, the tool 504 may have bristles 505 formed of the same and/or various different materials.

Figure 6:
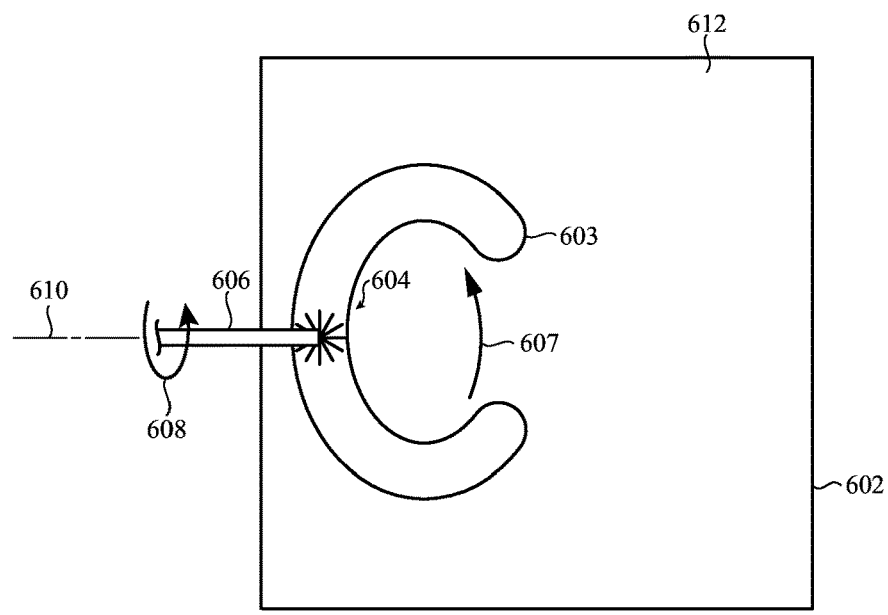
FIGS. 6-8 show formation of other three-dimensional features using an abrading process in accordance with further embodiments.

FIG. 6 shows formation of another three-dimensional feature using an abrading process in accordance with further embodiments. As contrasted with the example shown in FIGS. 2A-2B and 3, the three-dimensional feature 103 is instead a logo 603 in a surface 612 of a component 602. A tool 604 coupled to a shaft 606 may fill a segment of the logo 603 as the tool 604 rotates on an axis 610 in the direction 608 while the component 602 is rotated on a transverse axis (not labelled as the transverse axis is not visible in a top down view) in the direction 607, centered on the segment of the logo 603. Portions of the segment of the logo 603 may thus be abraded in multiple directions before the tool 604 and/or the component 602 is translated to move the tool 604 to and adjacent segment of the logo 603. The whole logo 603 may be abraded in this way by repetition of the rotation of the tool 604 and the component 602 and translation of the tool 604 and/or component 602 to move the tool 604 around the perimeter of the logo 603.

Figure 7:
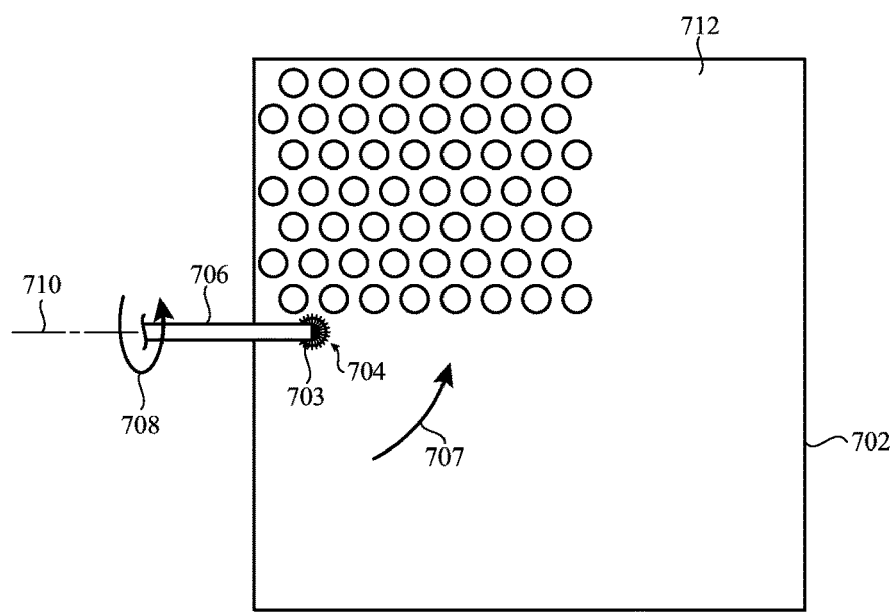

FIG. 7 shows formation of another three-dimensional feature using an abrading process in accordance with further embodiments. As contrasted with the example shown in FIGS. 2A-2B and 3, the three-dimensional feature 103 is instead one of a number of dimples 703 that provide texture for a surface 712 of a component 702. A tool 704 coupled to a shaft 706 may fill one of the dimples 703 as the tool 704 rotates on an axis 710 in the direction 708 while the component 702 is rotated on a transverse axis (not labelled as the transverse axis is not visible in a top down view) in the direction 707, centered on the dimple 703. The dimple 703 may thus be abraded in multiple directions before the tool 704 and/or the component 702 is translated to move the tool 704 to process another dimple 703. Various numbers of dimples 703 may be provided in this way to texture all and/or portions of the surface 712 by repetition of the rotation of the tool 704 and the component 702 and translation of the tool 704 and/or component 702 to move the tool 704 around the surface 712.

Figure 8:
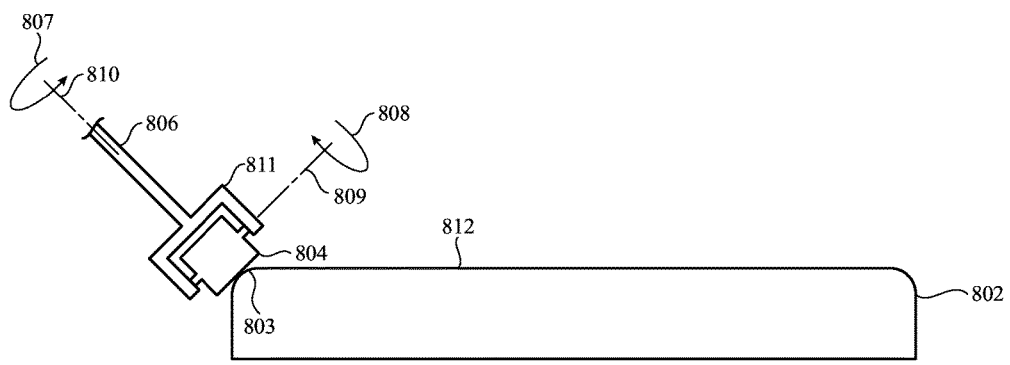

FIG. 8 shows formation of another three-dimensional feature using an abrading process in accordance with further embodiments. As contrasted with the example shown in FIGS. 2A-2B and 3, the three-dimensional feature 103 is instead a convex (with respect to the surface 812) edge 803 of a material 802. Further in this example, the material 802 is not rotated during abrading. Instead, a tool 804 coupled to a shaft 806 is mounted on a gimbal 811 such that the shaft 806 itself is rotated on a first axis 810 (in a first direction 807) while the tool 804 rotates on a second axis 809 (in a second direction 808) that is orthogonal to the first axis 810. In this way, abrading of portions of the convex edge 803 in multiple directions may be possible without rotation of the material 802.

The tool 804 may be sufficiently soft such that the tool 804 is able to surround a segment of the convex edge 803 during abrading. Portions of the segment of the convex edge 803 may thus be abraded in multiple directions before the tool 804 and/or the material 802 is translated to move the tool 804 to an adjacent segment of the convex edge 803 despite the projecting rather than sunken configuration of the convex edge 803. The whole convex edge 803 may be abraded in this way by repetition of the rotation of the shaft 806 and the tool 804 and translation of the tool 804 and/or the material 802 to move the tool 804 around the perimeter of the convex edge 803.

Figure 9:
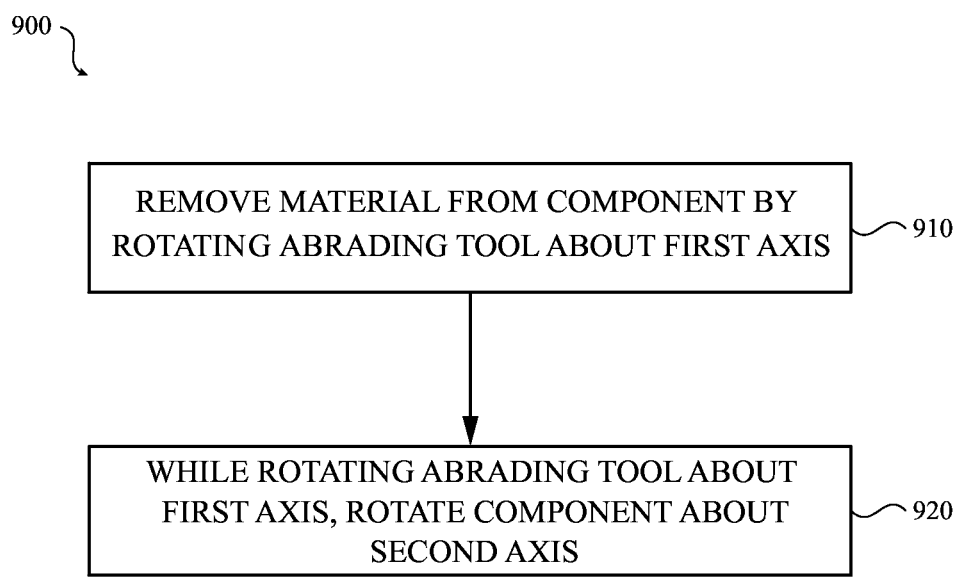
FIG. 9 shows an example method of forming a three-dimensional feature in a surface of a component. Such a process may be used in forming three-dimensional features 203 and/or 403-803 of FIGS. 1-8.

FIG. 9 shows an example method 900 of forming a three-dimensional feature in a surface of a component. Such a process may be used in forming the three-dimensional features 203 and/or 403-803 of FIGS. 1-8.

At 910, material may be removed from the component, such as by abrading. The material from the component may be performed by rotating an abrading tool about a first axis.

The abrading tool may contact an entirety of an exterior of the three-dimensional feature during removal of the material. The abrading tool may fill the three-dimensional feature during removal of the material. The abrading tool may have a shape that corresponds to a shape of the three-dimensional feature in two planes that are normal to each other. For example, the three-dimensional feature may be a curved depression that is concave with respect to the planar surface, and the abrading tool may be a spherical bristle brush that is convex with respect to the planar surface. The radius of the spherical bristle brush may correspond, or substantially correspond, to a diameter of the three-dimensional feature.

In some implementations, rotating the abrading tool may involve rotating the entire abrading tool, such as where the abrading tool includes a spherical brush fixedly mounted on the end of a rotatable shaft. In other implementations, rotating the abrading tool may involve rotating the abrading tool on the end of a shaft. In such implementations, the shaft coupled to the abrading tool may or may not also rotate. In cases where the shaft also rotates, the shaft may rotate in a different direction and/or on a different axis than the abrading tool.

At 920, the component may be rotated about a second axis. The second axis may be transverse to the first axis. The component may be rotated about the second axis while the abrading tool is rotated about the first axis. Rotation of the component and the abrading tool may be synchronized. In various examples, the abrading tool may be continuously rotated while the component is continuously rotated, iteratively rotated, rotated in oscillating directions, and so on.

In 910-920, the abrading tool may be rotated on a first axis while the component may be rotated on a second axis during material removal. The material removal may be performed in multiple directions. As the abrading tool may contact an entirety of an exterior of the three-dimensional feature during removal of the material, a portion of the three-dimensional feature may be removed in a first direction. As the component rotates, the position of the abrading tool with respect to the portion may change such that the removal of the material is subsequently performed in one or more other directions. In other words, the operation of removing the material may abrade a portion of the exterior of the three-dimensional feature in a first direction. The operation of removing the material may then abrade the portion of the exterior of the three-dimensional feature in a second direction.

Although the example method 900 is illustrated and described as including particular operations performed in a particular order, it is understood that this is an example. In various implementations, various orders of the same, similar, and/or different operations may be performed without departing from the scope of the present disclosure.

For example, 910-920 are illustrated as sequential, linear operations. However, it is understood that this is for the purposes of clarity. In various implementations, multiple of 910-920 may be performed at the same, or substantially the same, time without departing from the scope of the present disclosure.

By way of another example, 920 describes rotating the component on the second axis. However, in various implementations, the component may not be rotated. Instead, a shaft coupled to the abrading tool may be operable to rotate on the first axis while the abrading tool rotates on the second axis.

By way of still another example, rotation of the abrading tool and the component are described as synchronized. However, in various implementations, such operations may be performed in steps. For example, the abrading tool may be rotated and paused while the component is rotated 5 degrees. The abrading tool may then be rotated again before pausing and rotating the component again. By way of another example, the abrading tool may be rotated without rotating the component. Rotation of the abrading tool may then continue while rotation of the component commences. Various operational orders are possible and contemplated.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

As described above and illustrated in the accompanying figures, the present disclosure relates to finishing three-dimensional features using abrading and/or other processes that remove material, such as polishing, lapping, and grinding. A three-dimensional feature may be formed in a surface of a component. Material may be removed from the component by rotating an abrading tool about a first axis. While the abrading tool is rotated, the component (and/or a shaft coupled to the abrading tool) may be rotated on a second axis. The second axis may be transverse to the first axis and may run through a center of the three-dimensional feature. The abrading tool may correspond to the three-dimensional feature. For example, the abrading tool may be configured to contact an entirety of an exterior of the three-dimensional feature during the removal operation, fill the three-dimensional feature during the removal operation, and/or have a shape that corresponds to the shape of the three-dimensional feature in two planes that are normal to each other. In this way, material may be removed from portions of the three-dimensional feature in a first direction and subsequently material may be removed from the same portions in one or more additional directions. This may prevent, reduce, and/or ameliorate streaks, brush lines or other artifacts related to the material removal.

In the present disclosure, the methods disclosed may be implemented as sets of instructions or software readable by a device, such as a computer controlled manufacture apparatus. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for forming a three-dimensional feature in a surface of a cover for an electronic device, comprising:
    removing material from the cover by rotating a spherical bristle brush including multiple abrasive bristles about a first axis, the outer periphery of the multiple abrasive bristles defines a spherical shape; and
    while rotating the spherical bristle brush about the first axis, rotating the cover about a second axis that is orthogonal to the first axis; wherein
    the spherical bristle brush contacts an entirety of the three-dimensional feature during the operations of removing the material and rotating the cover.

2. The method of claim 1, wherein the operation of removing the material abrades a portion of an exterior of the three-dimensional feature in a first direction and then abrades the portion of the exterior of the three-dimensional feature in a second direction.

3. The method of claim 1, wherein the operation of removing the material forms the three-dimensional feature in a flat area of the surface.

4. The method of claim 1, wherein the three-dimensional feature has a concave dome shape and the spherical bristle brush has a convex shape matching the concave dome shape.

5. The method of claim 1, wherein the operation of rotating the cover comprises rotating the cover at least 90 degrees.

6. The method of claim 1, wherein the operation of removing the material comprises polishing the three-dimensional feature.

7. The method of claim 6, further comprising polishing the surface of the cover, wherein the surface is planar.

8. The method of claim 7, wherein the operation of polishing the surface of the cover comprises polishing the surface of the cover using a flat rotary brush.

9. The method of claim 1, wherein the second axis runs through a center of the three-dimensional feature.

* * * * *